(12) United States Patent
Hooper et al.

(10) Patent No.: US 7,443,836 B2
(45) Date of Patent: Oct. 28, 2008

(54) PROCESSING A DATA PACKET

(75) Inventors: Donald F. Hooper, Shrewsbury, MA (US); Mark B. Rosenbluth, Uxbridge, MA (US); Gilbert Wolrich, Framingham, MA (US); Matthew J. Adiletta, Bolton, MA (US); Hugh M. Wilkinson, III, Newton, MA (US); Robert J. Kushlis, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 947 days.

(21) Appl. No.: 10/463,217

(22) Filed: Jun. 16, 2003

(65) Prior Publication Data
US 2004/0252686 A1 Dec. 16, 2004

(51) Int. Cl.
*H04L 12/66* (2006.01)
(52) U.S. Cl. ....................................................... 370/352
(58) Field of Classification Search ........................ None
See application file for complete search history.

(56) References Cited

U.S. PATENT DOCUMENTS

| | | |
|---|---|---|
| 3,373,408 A | 3/1968 | Ling |
| 3,478,322 A | 11/1969 | Evans |
| 3,623,001 A | 11/1971 | Kleist et al. |
| 3,736,566 A | 5/1973 | Anderson et al. |
| 3,792,441 A | 2/1974 | Wymore et al. |
| 3,889,243 A | 6/1975 | Drimak |
| 3,940,745 A | 2/1976 | Sajeva |
| 4,016,548 A | 4/1977 | Law et al. |
| 4,032,899 A | 6/1977 | Jenny et al. |
| 4,075,691 A | 2/1978 | Davis et al. |
| 4,130,890 A | 12/1978 | Adam |
| 4,400,770 A | 8/1983 | Chan et al. |
| 4,514,807 A | 4/1985 | Nogi |
| 4,523,272 A | 6/1985 | Fukunaga et al. |
| 4,658,351 A | 4/1987 | Teng |
| 4,709,347 A | 11/1987 | Kirk |
| 4,745,544 A | 5/1988 | Renner et al. |
| 4,788,640 A | 11/1988 | Hansen |
| 4,831,358 A | 5/1989 | Ferrio et al. |
| 4,858,108 A | 8/1989 | Ogawa et al. |
| 4,866,664 A | 9/1989 | Burkhardt, Jr. et al. |
| 4,890,218 A | 12/1989 | Bram |

(Continued)

FOREIGN PATENT DOCUMENTS

EP 0 379 709 8/1990

(Continued)

OTHER PUBLICATIONS

"10-/100-Mbps Ethernet Media Access Controller (MAC) Core", NEC, 1998, pp. 1-5.

(Continued)

*Primary Examiner*—Ramnandan Singh
(74) *Attorney, Agent, or Firm*—Fish & Richardson P.C.

(57) ABSTRACT

A device and method for processing a data packet at a device are described. The device receives data packets and determines available memory in one or more of local memories of a plurality of execution threads. The device stores packet information in an available one of the local memories of the execution threads.

26 Claims, 6 Drawing Sheets

U.S. PATENT DOCUMENTS

| | | |
|---|---|---|
| 4,890,222 A | 12/1989 | Kirk |
| 4,991,112 A | 2/1991 | Callemyn |
| 5,115,507 A | 5/1992 | Callemyn |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,251,205 A | 10/1993 | Callon et al. |
| 5,255,239 A | 10/1993 | Taborn et al. |
| 5,263,169 A | 11/1993 | Genusov et al. |
| 5,313,454 A | 5/1994 | Bustini et al. |
| 5,347,648 A | 9/1994 | Stamm et al. |
| 5,367,678 A | 11/1994 | Lee et al. |
| 5,379,295 A | 1/1995 | Yonehara |
| 5,379,432 A | 1/1995 | Orton et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,469 A | 4/1995 | Chung et al. |
| 5,404,482 A | 4/1995 | Stamm et al. |
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,452,452 A | 9/1995 | Gaetner et al. |
| 5,459,842 A | 10/1995 | Begun et al. |
| 5,459,843 A | 10/1995 | Davis et al. |
| 5,463,625 A | 10/1995 | Yasrebi |
| 5,467,452 A | 11/1995 | Blum et al. |
| 5,475,856 A | 12/1995 | Kogge |
| 5,485,455 A | 1/1996 | Dobbins et al. |
| 5,515,296 A | 5/1996 | Agarwal |
| 5,517,648 A | 5/1996 | Bertone et al. |
| 5,539,737 A | 7/1996 | Lo et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,476 A | 10/1996 | Sherer et al. |
| 5,568,617 A | 10/1996 | Kametani |
| 5,574,922 A | 11/1996 | James |
| 5,581,729 A | 12/1996 | Nistala et al. |
| 5,592,622 A | 1/1997 | Isfeld et al. |
| 5,613,071 A | 3/1997 | Rankin et al. |
| 5,613,136 A | 3/1997 | Casavant et al. |
| 5,617,327 A | 4/1997 | Duncan |
| 5,623,489 A | 4/1997 | Cotton et al. |
| 5,627,829 A | 5/1997 | Gleeson et al. |
| 5,630,074 A | 5/1997 | Beltran |
| 5,630,130 A | 5/1997 | Perotto et al. |
| 5,633,865 A | 5/1997 | Short |
| 5,644,623 A | 7/1997 | Gulledge |
| 5,649,110 A | 7/1997 | Ben-Nun et al. |
| 5,649,157 A | 7/1997 | Williams |
| 5,651,002 A | 7/1997 | Van Seters et al. |
| 5,659,687 A | 8/1997 | Kim et al. |
| 5,680,641 A | 10/1997 | Sidman |
| 5,689,566 A | 11/1997 | Nguyen |
| 5,692,126 A | 11/1997 | Templeton et al. |
| 5,699,537 A | 12/1997 | Sharangpani et al. |
| 5,701,434 A | 12/1997 | Nakagawa |
| 5,717,898 A | 2/1998 | Kagan et al. |
| 5,721,870 A | 2/1998 | Matsumoto |
| 5,724,574 A | 3/1998 | Stratigos et al. |
| 5,740,402 A | 4/1998 | Bratt et al. |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,754,764 A | 5/1998 | Davis et al. |
| 5,761,507 A | 6/1998 | Govett |
| 5,761,522 A | 6/1998 | Hisanaga et al. |
| 5,764,915 A | 6/1998 | Heimsoth et al. |
| 5,768,528 A | 6/1998 | Stumm |
| 5,781,551 A | 7/1998 | Born |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,805,816 A | 9/1998 | Picazo, Jr. et al. |
| 5,809,235 A | 9/1998 | Sharma et al. |
| 5,809,237 A | 9/1998 | Watts et al. |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. |
| 5,828,881 A | 10/1998 | Wang |
| 5,828,901 A | 10/1998 | O'Toole et al. |
| 5,832,215 A | 11/1998 | Kato et al. |
| 5,835,755 A | 11/1998 | Stellwagen, Jr. |
| 5,838,988 A | 11/1998 | Panwar et al. |
| 5,850,399 A | 12/1998 | Ganmukhi et al. |
| 5,850,530 A | 12/1998 | Chen et al. |
| 5,854,922 A | 12/1998 | Gravenstein et al. |
| 5,857,188 A | 1/1999 | Douglas |
| 5,860,138 A | 1/1999 | Engebretsen et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,898,686 A | 4/1999 | Virgile |
| 5,898,701 A | 4/1999 | Johnson |
| 5,905,876 A | 5/1999 | Pawlowski et al. |
| 5,905,889 A | 5/1999 | Wilhelm, Jr. |
| 5,909,686 A | 6/1999 | Muller et al. |
| 5,915,123 A | 6/1999 | Mirsky et al. |
| 5,918,235 A | 6/1999 | Kirshenbaum et al. |
| 5,933,627 A | 8/1999 | Parady |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,953,336 A | 9/1999 | Moore et al. |
| 5,958,031 A | 9/1999 | Kim |
| 5,961,628 A | 10/1999 | Nguyen et al. |
| 5,968,169 A | 10/1999 | Pickett |
| 5,970,013 A | 10/1999 | Fischer et al. |
| 5,974,518 A | 10/1999 | Nogradi |
| 5,978,838 A | 11/1999 | Mohamed et al. |
| 5,983,274 A | 11/1999 | Hyder et al. |
| 5,995,513 A | 11/1999 | Harrand et al. |
| 6,012,151 A | 1/2000 | Mano |
| 6,014,729 A | 1/2000 | Lannan et al. |
| 6,023,742 A | 2/2000 | Ebeling et al. |
| 6,032,190 A | 2/2000 | Bremer et al. |
| 6,032,218 A | 2/2000 | Lewin et al. |
| 6,047,002 A | 4/2000 | Hartmann et al. |
| 6,049,867 A | 4/2000 | Eickemeyer et al. |
| 6,058,168 A | 5/2000 | Braband |
| 6,061,710 A | 5/2000 | Eickemeyer et al. |
| 6,067,300 A | 5/2000 | Baumert et al. |
| 6,067,585 A | 5/2000 | Hoang |
| 6,070,231 A | 5/2000 | Ottinger |
| 6,072,781 A | 6/2000 | Feeney et al. |

| | | | |
|---|---|---|---|
| 6,073,215 A | 6/2000 | Snyder | |
| 6,079,008 A | 6/2000 | Clery, III | |
| 6,085,215 A | 7/2000 | Ramakrishnan et al. | |
| 6,085,248 A | 7/2000 | Sambamurthy et al. | |
| 6,085,294 A | 7/2000 | Van Doren et al. | |
| 6,092,127 A | 7/2000 | Tausheck | |
| 6,092,158 A | 7/2000 | Harriman et al. | |
| 6,104,700 A | 8/2000 | Haddock et al. | |
| 6,111,886 A | 8/2000 | Stewart | |
| 6,112,016 A | 8/2000 | MacWilliams et al. | |
| 6,122,251 A | 9/2000 | Shinohara | |
| 6,128,669 A | 10/2000 | Moriarty et al. | |
| 6,134,665 A | 10/2000 | Klein et al. | |
| 6,141,677 A | 10/2000 | Hanif et al. | |
| 6,141,689 A | 10/2000 | Yasrebi | |
| 6,141,765 A | 10/2000 | Sherman | |
| 6,144,669 A | 11/2000 | Williams et al. | |
| 6,145,054 A | 11/2000 | Mehrotra et al. | |
| 6,157,955 A | 12/2000 | Narad et al. | |
| 6,160,562 A | 12/2000 | Chin et al. | |
| 6,170,051 B1 | 1/2001 | Dowling | |
| 6,175,927 B1 | 1/2001 | Cromer et al. | |
| 6,182,177 B1 | 1/2001 | Harriman | |
| 6,195,676 B1 | 2/2001 | Spix et al. | |
| 6,199,133 B1 | 3/2001 | Schnell | |
| 6,201,807 B1 | 3/2001 | Prasanna | |
| 6,212,542 B1 | 4/2001 | Kahle et al. | |
| 6,212,544 B1 | 4/2001 | Borkenhagen et al. | |
| 6,212,604 B1 | 4/2001 | Tremblay | |
| 6,212,611 B1 | 4/2001 | Nizar et al. | |
| 6,216,220 B1 | 4/2001 | Hwang | |
| 6,223,207 B1 | 4/2001 | Lucovsky et al. | |
| 6,223,238 B1 | 4/2001 | Meyer et al. | |
| 6,223,243 B1 | 4/2001 | Ueda et al. | |
| 6,223,274 B1 | 4/2001 | Catthoor et al. | |
| 6,223,279 B1 | 4/2001 | Nishimura et al. | |
| 6,247,025 B1 | 6/2001 | Bacon | |
| 6,256,713 B1 | 7/2001 | Audityan et al. | |
| 6,269,391 B1 | 7/2001 | Gillespie | |
| 6,272,109 B1 | 8/2001 | Pei et al. | |
| 6,272,520 B1 | 8/2001 | Sharangpani et al. | |
| 6,272,616 B1 | 8/2001 | Fernando et al. | |
| 6,275,505 B1 | 8/2001 | O'Loughlin et al. | |
| 6,279,113 B1 | 8/2001 | Vaidya | |
| 6,282,169 B1 | 8/2001 | Kiremidjian | |
| 6,286,083 B1 | 9/2001 | Chin et al. | |
| 6,289,011 B1 | 9/2001 | Seo et al. | |
| 6,295,600 B1 | 9/2001 | Parady | |
| 6,298,370 B1 | 10/2001 | Tang et al. | |
| 6,307,789 B1 | 10/2001 | Wolrich et al. | |
| 6,311,261 B1 | 10/2001 | Chamdani et al. | |
| 6,320,861 B1 | 11/2001 | Adam et al. | |
| 6,324,624 B1 | 11/2001 | Wolrich et al. | |
| 6,335,932 B2 | 1/2002 | Kadambi et al. | |
| 6,338,078 B1 | 1/2002 | Chang et al. | |
| 6,345,334 B1 | 2/2002 | Nakagawa et al. | |
| 6,347,344 B1 | 2/2002 | Baker et al. | |
| 6,349,331 B1 | 2/2002 | Andra et al. | |
| 6,356,962 B1 | 3/2002 | Kasper et al. | |
| 6,359,911 B1 | 3/2002 | Movshovich et al. | |
| 6,360,262 B1 | 3/2002 | Guenthner et al. | |
| 6,360,277 B1 | 3/2002 | Ruckley et al. | |
| 6,366,998 B1 | 4/2002 | Mohamed | |
| 6,373,848 B1 | 4/2002 | Allison et al. | |
| 6,377,998 B2 | 4/2002 | Noll et al. | |
| 6,389,031 B1 | 5/2002 | Chao et al. | |
| 6,389,449 B1 | 5/2002 | Nemirovsky et al. | |
| 6,393,026 B1 | 5/2002 | Irwin | |
| 6,393,483 B1 | 5/2002 | Latif et al. | |
| 6,404,737 B1 | 6/2002 | Novik et al. | |
| 6,415,338 B1 | 7/2002 | Habot | |
| 6,418,488 B1 | 7/2002 | Chilton et al. | |
| 6,424,657 B1 | 7/2002 | Voit et al. | |
| 6,424,659 B2 | 7/2002 | Viswanadham et al. | |
| 6,426,940 B1 | 7/2002 | Seo et al. | |
| 6,426,943 B1 | 7/2002 | Spinney et al. | |
| 6,427,196 B1 | 7/2002 | Adiletta et al. | |
| 6,430,626 B1 | 8/2002 | Witkowski et al. | |
| 6,434,145 B1 | 8/2002 | Opsasnick et al. | |
| 6,438,132 B1 | 8/2002 | Vincent et al. | |
| 6,438,134 B1 | 8/2002 | Chow et al. | |
| 6,448,812 B1 | 9/2002 | Bacigalupo | |
| 6,453,404 B1 | 9/2002 | Bereznyi et al. | |
| 6,457,015 B1 | 9/2002 | Eastham | |
| 6,463,035 B1 | 10/2002 | Moore | |
| 6,463,072 B1 | 10/2002 | Wolrich et al. | |
| 6,463,480 B2 | 10/2002 | Kikuchi et al. | |
| 6,463,527 B1 | 10/2002 | Vishkin | |
| 6,466,898 B1 | 10/2002 | Chan | |
| 6,477,562 B2 | 11/2002 | Nemirovsky et al. | |
| 6,484,224 B1 | 11/2002 | Robins et al. | |
| 6,501,731 B1 | 12/2002 | Chong et al. | |
| 6,507,862 B1 | 1/2003 | Joy et al. | |
| 6,522,188 B1 | 2/2003 | Poole | |
| 6,526,451 B2 | 2/2003 | Kasper | |
| 6,526,452 B1 | 2/2003 | Petersen et al. | |
| 6,529,983 B1 | 3/2003 | Marshall et al. | |
| 6,532,509 B1 | 3/2003 | Wolrich et al. | |
| 6,535,878 B1 | 3/2003 | Guedalia et al. | |
| 6,552,826 B2 | 4/2003 | Adler et al. | |
| 6,553,406 B1 | 4/2003 | Berger et al. | |
| 6,560,667 B1 | 5/2003 | Wolrich et al. | |
| 6,570,850 B1 | 5/2003 | Gutierrez et al. | |
| 6,577,542 B2 | 6/2003 | Wolrich et al. | |
| 6,584,522 B1 | 6/2003 | Wolrich et al. | |
| 6,587,906 B2 | 7/2003 | Wolrich et al. | |
| 6,604,125 B1 | 8/2003 | Belkin | |
| 6,606,704 B1 | 8/2003 | Adiletta et al. | |
| 6,625,654 B1 | 9/2003 | Wolrich et al. | |
| 6,628,668 B1 | 9/2003 | Hutzli et al. | |
| 6,629,147 B1 | 9/2003 | Grow | |
| 6,629,236 B1 | 9/2003 | Aipperspach et al. | |
| 6,631,422 B1 | 10/2003 | Althaus et al. | |
| 6,631,430 B1 | 10/2003 | Wolrich et al. | |
| 6,631,462 B1 | 10/2003 | Wolrich et al. | |
| 6,657,963 B1 | 12/2003 | Paquette et al. | |
| 6,658,551 B1 | 12/2003 | Berenbaum et al. | |
| 6,661,774 B1 | 12/2003 | Lauffenburger et al. | |
| 6,661,794 B1 | 12/2003 | Wolrich et al. | |
| 6,665,699 B1 | 12/2003 | Hunter et al. | |
| 6,665,755 B2 | 12/2003 | Modelski et al. | |
| 6,667,920 B2 | 12/2003 | Wolrich et al. | |
| 6,668,317 B1 | 12/2003 | Bernstein et al. | |
| 6,671,827 B2 | 12/2003 | Guilford et al. | |
| 6,675,190 B1 | 1/2004 | Schabernack et al. | |
| 6,675,192 B2 | 1/2004 | Emer et al. | |
| 6,678,746 B1 | 1/2004 | Russell et al. | |
| 6,680,933 B1 | 1/2004 | Cheesman et al. | |
| 6,681,300 B2 | 1/2004 | Wolrich et al. | |
| 6,684,326 B1 | 1/2004 | Cromer et al. | |
| 6,694,380 B1 | 2/2004 | Wolrich et al. | |
| 6,697,379 B1 | 2/2004 | Jacquet et al. | |
| 6,721,325 B1 | 4/2004 | Duckering et al. | |
| 6,724,767 B1 | 4/2004 | Chong et al. | |
| 6,728,845 B2 | 4/2004 | Adiletta | |
| 6,732,187 B1 | 5/2004 | Lougheed et al. | |
| 6,754,211 B1 | 6/2004 | Brown | |
| 6,754,222 B1 | 6/2004 | Joung et al. | |
| 6,768,717 B1 | 7/2004 | Reynolds et al. | |
| 6,775,284 B1 * | 8/2004 | Calvignac et al. | 370/392 |
| 6,792,488 B2 | 9/2004 | Wolrich et al. | |
| 6,798,744 B1 | 9/2004 | Loewen et al. | |
| 6,826,615 B2 | 11/2004 | Barrall et al. | |
| 6,834,053 B1 | 12/2004 | Stacey et al. | |
| 6,850,521 B1 | 2/2005 | Kadambi et al. | |
| 6,856,622 B1 | 2/2005 | Calamvokis et al. | |

| | | | |
|---|---|---|---|
| 6,873,618 B1 | 3/2005 | Weaver | |
| 6,876,561 B2 | 4/2005 | Wolrich et al. | |
| 6,895,457 B2 | 5/2005 | Wolrich et al. | |
| 6,925,637 B2 | 8/2005 | Thomas et al. | |
| 6,931,641 B1 | 8/2005 | Davis et al. | |
| 6,934,780 B2 | 8/2005 | Modelski et al. | |
| 6,934,951 B2 | 8/2005 | Wilkinson et al. | |
| 6,938,147 B1 | 8/2005 | Joy et al. | |
| 6,944,850 B2 | 9/2005 | Hooper et al. | |
| 6,947,425 B1 | 9/2005 | Hooper et al. | |
| 6,952,824 B1 | 10/2005 | Hooper et al. | |
| 6,959,002 B2 | 10/2005 | Wynne et al. | |
| 6,967,963 B1 * | 11/2005 | Houh et al. | 370/428 |
| 6,976,095 B1 | 12/2005 | Wolrich et al. | |
| 6,981,077 B2 | 12/2005 | Modelski et al. | |
| 6,983,350 B1 | 1/2006 | Wheeler et al. | |
| 7,006,495 B2 | 2/2006 | Hooper | |
| 7,065,569 B2 | 6/2006 | Teraslinna | |
| 7,069,548 B2 | 6/2006 | Kushlis | |
| 7,096,277 B2 | 8/2006 | Hooper | |
| 7,100,102 B2 | 8/2006 | Hooper et al. | |
| 7,111,072 B1 | 9/2006 | Matthews et al. | |
| 7,111,296 B2 | 9/2006 | Wolrich et al. | |
| 7,124,196 B2 | 10/2006 | Hooper | |
| 7,126,952 B2 | 10/2006 | Hooper et al. | |
| 7,149,786 B1 | 12/2006 | Bohringer et al. | |
| 7,181,742 B2 | 2/2007 | Hooper | |
| 7,191,321 B2 | 3/2007 | Bernstein et al. | |
| 7,206,858 B2 | 4/2007 | Hooper et al. | |
| 7,248,584 B2 * | 7/2007 | Hooper | 370/392 |
| 7,305,500 B2 | 12/2007 | Adiletta et al. | |
| 7,328,289 B2 | 2/2008 | Wolrich et al. | |
| 7,352,769 B2 | 4/2008 | Hooper et al. | |
| 2001/0023487 A1 | 9/2001 | Kawamoto | |
| 2002/0027448 A1 | 3/2002 | Bacigalupo | |
| 2002/0041520 A1 | 4/2002 | Wolrich et al. | |
| 2002/0075878 A1 | 6/2002 | Lee et al. | |
| 2002/0118692 A1 | 8/2002 | Oberman et al. | |
| 2002/0150047 A1 | 10/2002 | Knight et al. | |
| 2002/0181194 A1 | 12/2002 | Ho et al. | |
| 2003/0043803 A1 | 3/2003 | Hooper | |
| 2003/0067934 A1 | 4/2003 | Hooper et al. | |
| 2003/0086434 A1 | 5/2003 | Kloth | |
| 2003/0105901 A1 | 6/2003 | Wolrich et al. | |
| 2003/0105917 A1 | 6/2003 | Ostler et al. | |
| 2003/0110166 A1 | 6/2003 | Wolrich et al. | |
| 2003/0115347 A1 | 6/2003 | Wolrich et al. | |
| 2003/0115426 A1 | 6/2003 | Rosenbluth et al. | |
| 2003/0131198 A1 | 7/2003 | Wolrich et al. | |
| 2003/0140196 A1 | 7/2003 | Wolrich et al. | |
| 2003/0145159 A1 | 7/2003 | Adiletta et al. | |
| 2003/0147409 A1 | 8/2003 | Wolrich et al. | |
| 2003/0161303 A1 | 8/2003 | Mehrvar et al. | |
| 2003/0161337 A1 | 8/2003 | Weinman | |
| 2003/0196012 A1 | 10/2003 | Wolrich et al. | |
| 2003/0210574 A1 | 11/2003 | Wolrich et al. | |
| 2003/0231635 A1 | 12/2003 | Kalkunte et al. | |
| 2004/0039895 A1 | 2/2004 | Wolrich et al. | |
| 2004/0052269 A1 | 3/2004 | Hooper et al. | |
| 2004/0054880 A1 | 3/2004 | Bernstein et al. | |
| 2004/0059828 A1 | 3/2004 | Hooper et al. | |
| 2004/0071152 A1 | 4/2004 | Wolrich et al. | |
| 2004/0073728 A1 | 4/2004 | Wolrich et al. | |
| 2004/0073778 A1 | 4/2004 | Adiletta et al. | |
| 2004/0085901 A1 | 5/2004 | Hooper et al. | |
| 2004/0098496 A1 | 5/2004 | Wolrich et al. | |
| 2004/0109369 A1 | 6/2004 | Wolrich et al. | |
| 2004/0148382 A1 | 7/2004 | Narad et al. | |
| 2004/0162933 A1 | 8/2004 | Adiletta et al. | |
| 2005/0033884 A1 | 2/2005 | Wolrich et al. | |
| 2005/0149665 A1 | 7/2005 | Wolrich et al. | |
| 2006/0007871 A1 * | 1/2006 | Welin | 370/252 |
| 2006/0069882 A1 | 3/2006 | Wheeler et al. | |
| 2006/0156303 A1 | 7/2006 | Hooper et al. | |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 773 648 | 5/1997 |
| EP | 0 809 180 | 11/1997 |
| EP | 0 959 602 | 11/1999 |
| JP | 59-111533 | 6/1984 |
| WO | WO 94/15287 | 7/1994 |
| WO | WO 97/38372 | 10/1997 |
| WO | WO 98/20647 | 5/1998 |
| WO | WO 00/38376 | 6/2000 |
| WO | WO 00/56024 | 9/2000 |
| WO | WO 01/16718 | 3/2001 |
| WO | WO 01/16769 | 3/2001 |
| WO | WO 01/16770 | 3/2001 |
| WO | WO 01/16782 | 3/2001 |
| WO | WO 01/17179 | 3/2001 |
| WO | WO 01/31856 | 5/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO03/030461 | 4/2003 |

OTHER PUBLICATIONS

"Enterprise Hardware, Intel Expected to Unveil New Networking Chip," News.Com, Aug. 26, 1999, <http://new.com.com/Intel+expected+to+unveil+new+networking+chip/2100-1001_3-230315.html> (accessed on Aug. 23, 2005), pp. 1-5.

"The ATM Forum Technical Committee Traffic Management Specification Version 4.1", The ATM Forum (Mar. 1999).

Agarwal et al., "April: A Processor Architecture for Multiprocessing," Proceedings of the 17th Annual International Symposium on Computer Architecture, *IEEE*, pp. 104-114, (1990).

Beckerle, M.J., "Overview of the START (*T) multithreaded computer" (abstract only), Publication Date: Feb. 22-26, 1993.

Byrd et al., "Multithread Processor Architectures," *IEEE Spectrum*, 32(8):38-46, New York, Aug. 1995.

Chandranmenon, G.P., et al., "Trading Packet Headers for Packet Processing", *IEEE/ACM Transactions on Networking*, 4(2):141-152, Apr. 1996.

Chappell, et al., "Simultaneous Subordinate Microthreading (SSMT)", *IEEE*, p. 186-195 (1999).

*Dictionary of Computer Words: An A to Z Guide to Today's Computers, Revised Edition*, Houghton Mifflin Company: Boston, Massachusetts, pp. 220, (1995).

*Digital Semiconductor 21140A PCI Fast Ethernet LAN Controller, Hardware Reference Manual*, Digital Equipment Corporation, pp. i-x, 1-1 through 1-5, 2-1 throught 2-12, 3-1 through 3-38, 4-31 through 5-2, 6-1 through 6-24, (Mar. 1998).

Doyle et al., *Microsoft Press Computer Dictionary*, 2nd ed., Microsoft Press, Redmond, Washington, USA, p. 326, (1994).

Farrens, et al., "Strategies for Achieving Improved Processor Throughput", *ACM*, p. 362-369 (1991).

Fillo et al., "The M-Machine Multicomputer," *IEEE Proceedings of Micro*-28, pp. 146-156, (1995).

Frazier, Howard, "Gigabit Ethernet: From 100 to 1,000 Mbps", *IEEE Internet Computing*, pp. 24-31, (1999).

Frazier, Howard, "The 802.3z Gigabit Ethernet Standard", *IEEE Network*, pp. 6-7, (1998).

Giroux, N., et al., "Queuing and Scheduling: Quality of Service in ATM Networks, Chapter 5", *Quality of Service in ATM Networks: State-of-the-Art Traffic Management*, pp. 96-121 (1998).

Gomez et al., "Efficient Multithreaded User-Space Transport for Network Computing: Design and Test of the TRAP Protocol," *Journal of Parallel and Distributed Computing*, Academic Press, Duluth, Minnesota, USA, 40(1):103-117, Jan. 1997.

Govind, et al., "Performance modeling and architecture exploration of network processors", *Quantitative Evaluation of Systems*, abstract only (1 page), Sep. 2005.

Haug et al., "Reconfigurable hardware as shared resource for parallel threads," *IEEE Symposium on FPGAs for Custom Computing Machines*, 2 pages, (1998).

Hauser et al., "Garp: a MIPS processor with a reconfigurable coprocessor," *Proceedings of the 5th Annual IEEE Symposium on Field-Programmable Custom Computing Machines*, pp. 12-21, (1997).

Hyde, R., "Overview of Memory Management," *Byte*, 13(4):219-225, (1988).

Ippoliti, A., et al., "Parallel Media Access Controller for Packet Communications at Gb/s Rates", *IEEE*, pp. 991-996, (1990).

Jenks, S., et al., "Nomadic Threads: A migrating multithread approach to remote memory accesses in multiprocessors" (abstract only), Publication Date: Oct. 20-23, 1996.

Kaiserswerth, M., "The Parallel Protocol Engine", *IEEE/ACM Transactions on Networking*, 1(6):650-663, Dec. 1993.

Khailany, B., et al., "Imagine: Media Processing with Streams," IEEE Micro, Mar.-Apr. 2001, pp. 35-46.

Leon-Garcia, A., *Communication Networks: Fundamental Concepts and Key Architectures*, McGraw-Hill Higher Education, Copyright 2000, pp. 195-198, 215-219, & 380-385.

Lim, A., et al., "Improving Performance of Adaptive Media Access Control Protocols for High-Density Wireless Networks", *Proceedings of the 1999 International Symposium on Parallel Architectures, Algorithms and Networks (ISPAN '99)*, pp. 316-321, Jun. 1999.

Litch et al., "StrongARMing Portable Communications," *IEEE Micro*, 18(2):48-55, Mar. 1998.

Mollenauer, J.F., et al., "An Efficient Media Access Control Protocol for Broadband Wireless Access Systems", *IEEE Standard, IEEE 802.16 Broadband Wireless Access Working Group*, 19 pages, Oct. 1999.

Ocheltree, K.B., et al., "A comparison of fibre channel and 802 MAC services", *Proceedings of 18th Conference on Local Computer Networks*, abstract only, 1 page, Sep. 1993.

Schmidt et al., "The Performance of Alternative Threading Architectures for Parallel Communication Subsystems," Internet Document, *Online!*, Nov. 13, 1998, pp. 1-19.

Shaw, M.C., et al., *UNIX Internals: A Systems Operations Handbook*, Windcrest Books, pp. 30-37, 1987.

Thistle et al., "A Processor Architecture for Horizon," *IEEE Proc. Supercomputing '88*, pp. 35-41, Nov. 1988.

Todorova, P., et al., "Quality-of-Service-Oriented Media Access Control for Advanced Mobile Multimedia Satellite Systems", *Proceedings of the 36th Annual Hawaii International Conference on System Sciences (HICSS'03)*, 8 pages, Jan. 2003.

Tremblay et al., "A Three Dimensional Register File for Superscalar Processors," *IEEE Proceedings of the 28th Annual Hawaii International Conference on System Sciences*, pp. 191-201, (1995).

Trimberger et al, "A time-multiplexed FPGA," *Proceedings of the 5th Annual IEEE Symposium on Field-Programmable Custom Computing Machines*, pp. 22-28, (1997).

Turner et al., "Design of a High Performance Active Router," Internet Document, *Online!*, 20 pages, Mar. 18, 1999.

Vibhatavanij et al., "Simultaneous Multithreading-Based Routers," *Proceedings of the 2000 International Conference of Parallel Processing*, Toronto, Ontario, Canada, Aug. 21-24, 2000, pp. 362-369.

Vuppala, V., et al., "Layer-3 switching using virtual network ports", *IEEE Proc. Computer Communications and Networks*, pp. 642-648, 1999.

Wazlowski et al., "PRSIM-II computer and architecture," *IEEE Proceedings, Workshop on FPGAs for Custom Computing Machines*, pp. 9-16, (1993).

Wikipedia entry, "Media Access Control", retrieved from http://en.wikipedia.org/wiki/Media_access_control, 2 pages, Jul. 31, 2007.

U.S. Appl. No. 09/473,571, filed Dec. 28, 1999, Wolrich et al.

U.S. Appl. No. 09/475,614, filed Dec. 30, 1999, Wolrich et al.

* cited by examiner

PROCESSING A DATA PACKET

BACKGROUND

Networks enable computers and other devices to exchange data such as e-mail messages, web pages, audio, video, and so forth. To send data across a network, a sending device typically constructs a collection of packets. In networks, individual packets store some portion of the data being sent. A receiver can reassemble the data into its original form after receiving the packets.

A packet traveling across a network may make many "hops" to intermediate network devices before reaching its final destination. A packet includes data being sent and information used to deliver the packet. This information is often stored in the packet's "payload" and "header(s)", respectively. The header(s) may include information for a number of different communication protocols that define the information that should be stored in a packet. Different protocols may operate at different layers. For example, a low level layer generally known as the "link layer" coordinates transmission of data over physical connections. A higher level layer generally known as the "network layer" handles routing, switching, and other tasks that determine how to move a packet forward through a network.

Many different hardware and software schemes have been developed to handle packets. For example, some designs use software to program a general purpose CPU (Central Processing Unit) processor to process packets. Other designs use components such as ASICs (application-specific integrated circuits), feature dedicated, "hard-wired" approaches. Field programmable processors enable software programmers to quickly reprogram network processor operations.

DETAILED DESCRIPTION

Figure 1:
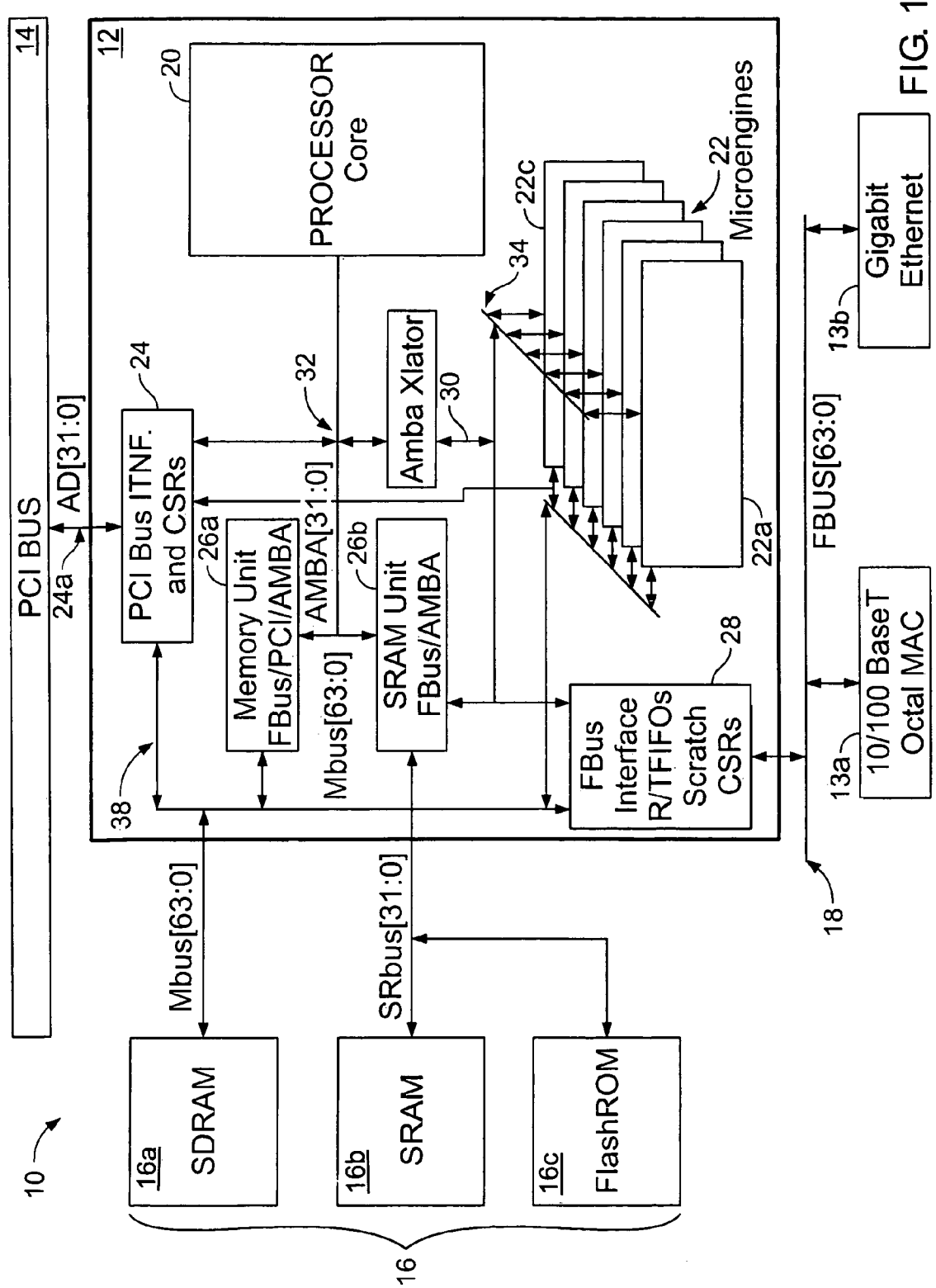
FIG. 1 is a block diagram of a communication system employing a hardware-based multithreaded processor.

Referring to FIG. 1, a communication system 10 includes a parallel, hardware-based multithreaded processor 12. The hardware-based multithreaded processor 12 is coupled to a bus such as a Peripheral Component Interconnect (PCI) bus 14, a memory system 16 and a second bus 18. The system 10 is especially useful for tasks that can be broken into parallel subtasks. Specifically hardware-based multithreaded processor 12 is useful for tasks that are bandwidth oriented rather than latency oriented. The hardware-based multithreaded processor 12 has multiple microengines 22 each with multiple hardware controlled program threads that can be simultaneously active and independently work on a task. A program thread is an independent program that runs a series of instruction. From the program's point-of-view, a program thread is the information needed to serve one individual user or a particular service request.

The hardware-based multithreaded processor 12 also includes a central controller 20 that assists in loading microcode control for other resources of the hardware-based multithreaded processor 12 and performs other general purpose computer type tasks such as handling protocols, exceptions, extra support for packet processing where the microengines pass the packets off for more detailed processing such as in boundary conditions. In one embodiment, the processor 20 is a StrongArm® (Arm is a trademark of ARM Limited, United Kingdom) based architecture. The general purpose microprocessor 20 has an operating system. Through the operating system the processor 20 can call functions to operate on microengines 22a-22f. The processor 20 can use supported operating system preferably a real time operating system. For the core processor implemented as a StrongArm architecture, operating systems such as, Microsoft NT real-time, VXWorks and μCUS, a freeware operating system available over the Internet, can be used.

The hardware-based multithreaded processor 12 also includes a plurality of microengines 22a-22f. Microengines 22a-22f each maintain a plurality of program counters in hardware and states associated with the program counters. Effectively, a corresponding plurality of sets of program threads can be simultaneously active on each of the microengines 22a-22f while only one is actually operating at one time.

In one embodiment, there are six microengines 22a-22f, each having capabilities for processing four hardware program threads. The six microengines 22a-22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM memory 16a and SDRAM controller 26a are typically used for processing large volumes of data, e.g., processing of network payloads from network packets. The SRAM controller 26b and SRAM memory 16b are used in a networking implementation for low latency, fast access tasks, e.g., accessing look-up tables, memory for the core processor 20, and so forth.

Hardware context swapping enables other contexts with unique program counters to execute in the same microengine. Hardware context swapping also synchronizes completion of tasks. For example, two program threads could request the same shared resource e.g., SRAM. Each one of these separate units, e.g., the FBUS interface 28, the SRAM controller 26a, and the SDRAM controller 26b, when they complete a requested task from one of the microengine program thread contexts reports back a flag signaling completion of an operation. When the flag is received by the microengine, the microengine can determine which program thread to turn on.

As a network processor the hardware-based multithreaded processor 12 interfaces to network devices such as a media access controller device e.g., a 10/100BaseT Octal MAC 13a or a Gigabit Ethernet device 13b coupled to communication ports or other physical layer devices. In general, as a network processor, the hardware-based multithreaded processor 12 can interface to different types of communication device or interface that receives/sends large amounts of data. The network processor can include a router 10 in a networking application route network packets amongst devices 13a, 13b in a parallel manner. With the hardware-based multithreaded processor 12, each network packet can be independently processed. 26.

The processor 12 includes a bus interface 28 that couples the processor to the second bus 18. Bus interface 28 in one embodiment couples the processor 12 to the so-called FBUS 18 (FIFO bus). The FBUS interface 28 is responsible for controlling and interfacing the processor 1b2 to the FBUS 18. The FBUS 18 is a 64-bit wide FIFO bus, used to interface to Media Access Controller (MAC) devices. The processor 12 includes a second interface e.g., a PCI bus interface 24 that couples other system components that reside on the PCI 14 bus to the processor 12. The units are coupled to one or more internal buses. The internal buses are dual, 32 bit buses (e.g., one bus for read and one for write). The hardware-based multithreaded processor 12 also is constructed such that the sum of the bandwidths of the internal buses in the processor 12 exceed the bandwidth of external buses coupled to the processor 12. The processor 12 includes an internal core processor bus 32, e.g., an ASB bus (Advanced System Bus) that couples the processor core 20 to the memory controllers 26a, 26b and to an ASB translator 30 described below. The ASB bus is a subset of the so-called AMBA bus that is used with the Strong Arm processor core. The processor 12 also includes a private bus 34 that couples the microengine units to SRAM controller 26b, ASB translator 30 and FBUS interface 28. A memory bus 38 couples the memory controller 26a, 26b to the bus interfaces 24 and 28 and memory system 16 including flashrom 16c used for boot operations and so forth.

Each of the microengines 22a-22f includes an arbiter that examines flags to determine the available program threads to be operated upon. The program thread of the microengines 22a-22f can access the SDRAM controller 26a, SDRAM controller 26b or FBUS interface 28. The SDRAM controller 26a and SDRAM controller 26b each include a plurality of queues to store outstanding memory reference requests. The queues either maintain order of memory references or arrange memory references to optimize memory bandwidth.

Although microengines 22 can use the register set to exchange data. A scratchpad or shared memory is also provided to permit microengines to write data out to the memory for other microengines to read. The scratchpad is coupled to bus 34.

Figures 1, 2:
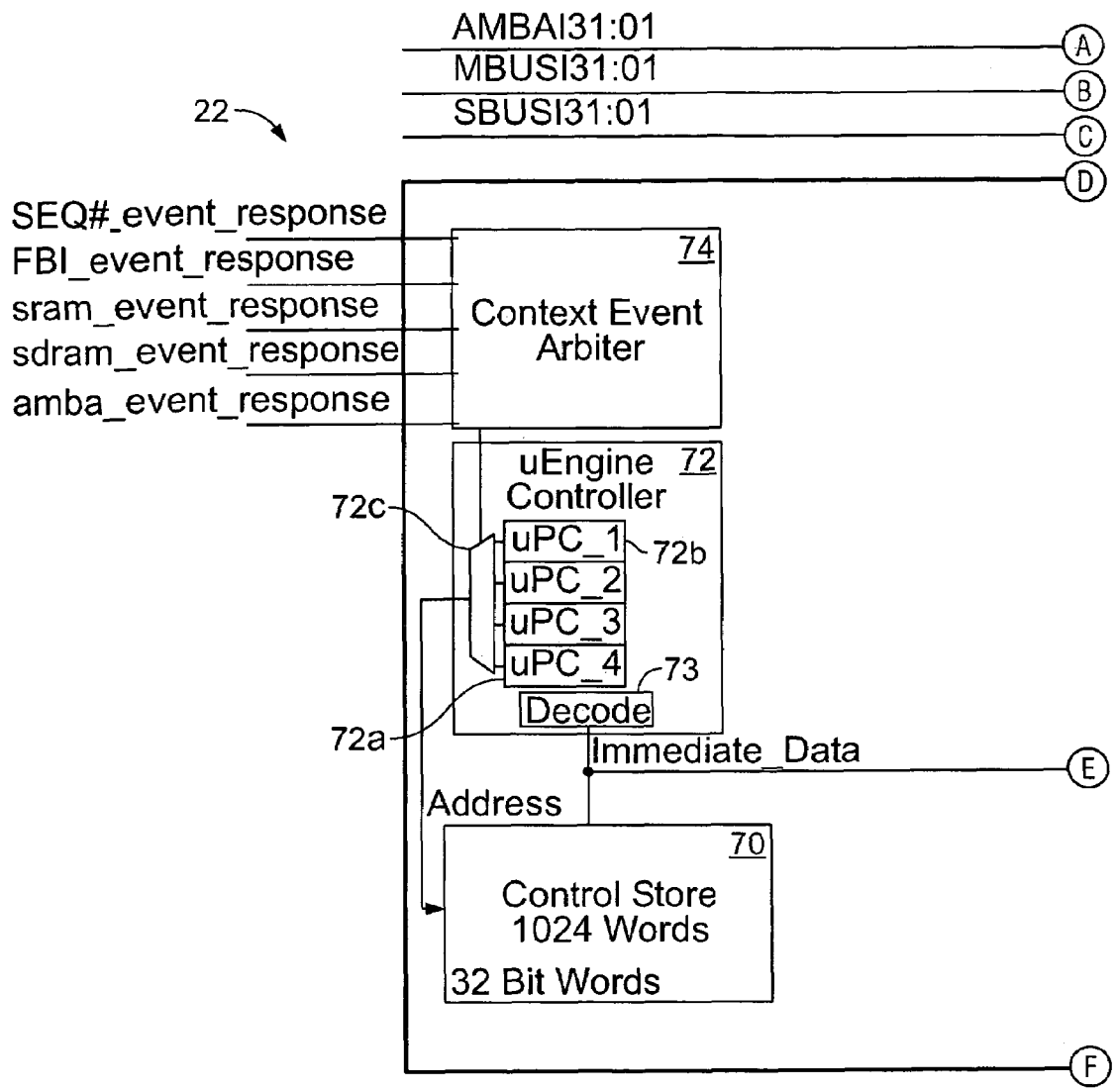
FIG. 2 is a block diagram of a microengine unit employed in the hardware-based multithreaded processor of FIG. 1.
Figure 2:
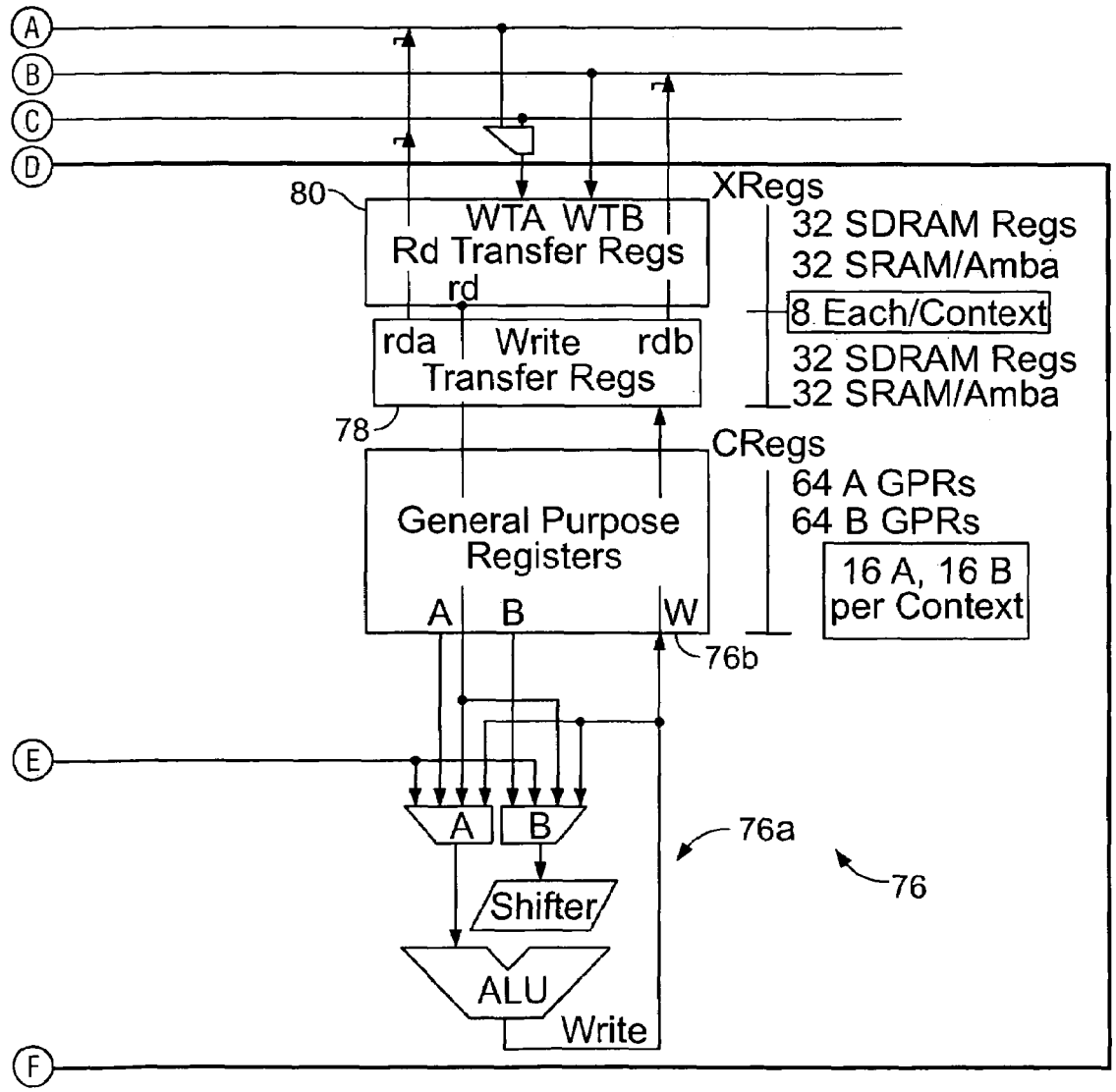

Referring to FIG. 2, an exemplary one of the microengines 22a-22f, e.g., microengine 22f is shown. The microengine includes a control store 70 which, in one implementation, includes a RAM of here 1,024 words of 32 bits. The RAM stores a microprogram that is loadable by the core processor 20. The microengine 22f also includes controller logic 72. The controller logic includes an instruction decoder 73 and program counter (PC) units 72a-72d. The four micro program counters 72a-72d are maintained in hardware. The microengine 22f also includes context event switching logic 74. Context event logic 74 receives messages (e.g., SEQ_#_EVENT_RESPONSE; FBI_EVENT_RESPONSE; SRAM_EVENT_RESPONSE; SDRAM_EVENT_RESPONSE; and ASB_EVENT_RESPONSE) from each one of the shared resources, e.g., SRAM 26a, SDRAM 26b, or processor core 20, control and status registers, and so forth. These messages provide information on whether a requested task has completed. Based on whether or not a task requested by a program thread has completed and signaled completion, the program thread needs to wait for that completion signal, and if the program thread is enabled to operate, then the program thread is placed on an available program thread list (not shown).

In addition to event signals that are local to an executing program thread, the microengines 22 employ signaling states that are global. With signaling states, an executing program thread can broadcast a signal state to the microengines 22. The program thread in the microengines can branch on these signaling states. These signaling states can be used to determine availability of a resource or whether a resource is due for servicing.

The context event logic 74 has arbitration for the program threads. In one embodiment, the arbitration is a round robin mechanism. Other techniques could be used including priority queuing or weighted fair queuing. The microengine 22f also includes an execution box (EBOX) data path 76 that includes an arithmetic logic unit 76a and general purpose register set 76b. The arithmetic logic unit 76a performs arithmetic and logic operation as well as shift operations. The registers set 76b has a relatively large number of general purpose registers. In this implementation there are 64 general purpose registers in a first bank, Bank A and 64 in a second bank, Bank B. The general purpose registers are windowed so that they are relatively and absolutely addressable.

The microengine 22f also includes a write transfer register stack 78 and a read transfer stack 80. These registers are also windowed so that they are relatively and absolutely addressable. Write transfer register stack 78 is where write data to a resource is located. Similarly, read register stack 80 is for return data from a shared resource. Subsequent to or concurrent with data arrival, an event signal from the respective shared resource e.g., the SRAM controller 26a, SDRAM controller 26b or core processor 20 will be provided to context event arbiter 74 which will then alert the program thread that the data is available or has been sent. Both transfer register banks 78 and 80 are connected to the execution box (EBOX) 76 through a data path. In one implementation, the read transfer register has 64 registers and the write transfer register has 64 registers.

Each microengine 22a-22f supports multi-threaded execution of multiple contexts. One reason for this is to allow one program thread to start executing just after another program thread issues a memory reference and must wait until that reference completes before doing more work. This behavior maintains efficient hardware execution of the microengines because memory latency is significant.

Special techniques such as inter-thread communications to communicate status and a thread_done register to provide a global program thread communication scheme is used for packet processing. The thread_done register can be implemented as a control and status register. Network operations are implemented in the network processor using a plurality of program threads e.g., contexts to process network packets. For example, scheduler program threads could be executed in one of the microprogram engines e.g., 22a whereas, processing program threads could execute in the remaining engines e.g., 22b-22f. The program threads (processing or scheduling program threads) use inter-thread communications to communicate status.

Program threads are assigned specific tasks such as receive and transmit scheduling, receive processing, and transmit processing, etc. Task assignment and task completion are communicated between program threads through the inter-thread signaling, registers with specialized read and write characteristics, e.g., the thread-done register, SRAM 16b and data stored in the internal scratchpad memory resulting from operations such as bit set, and bit clear.

Figure 3:
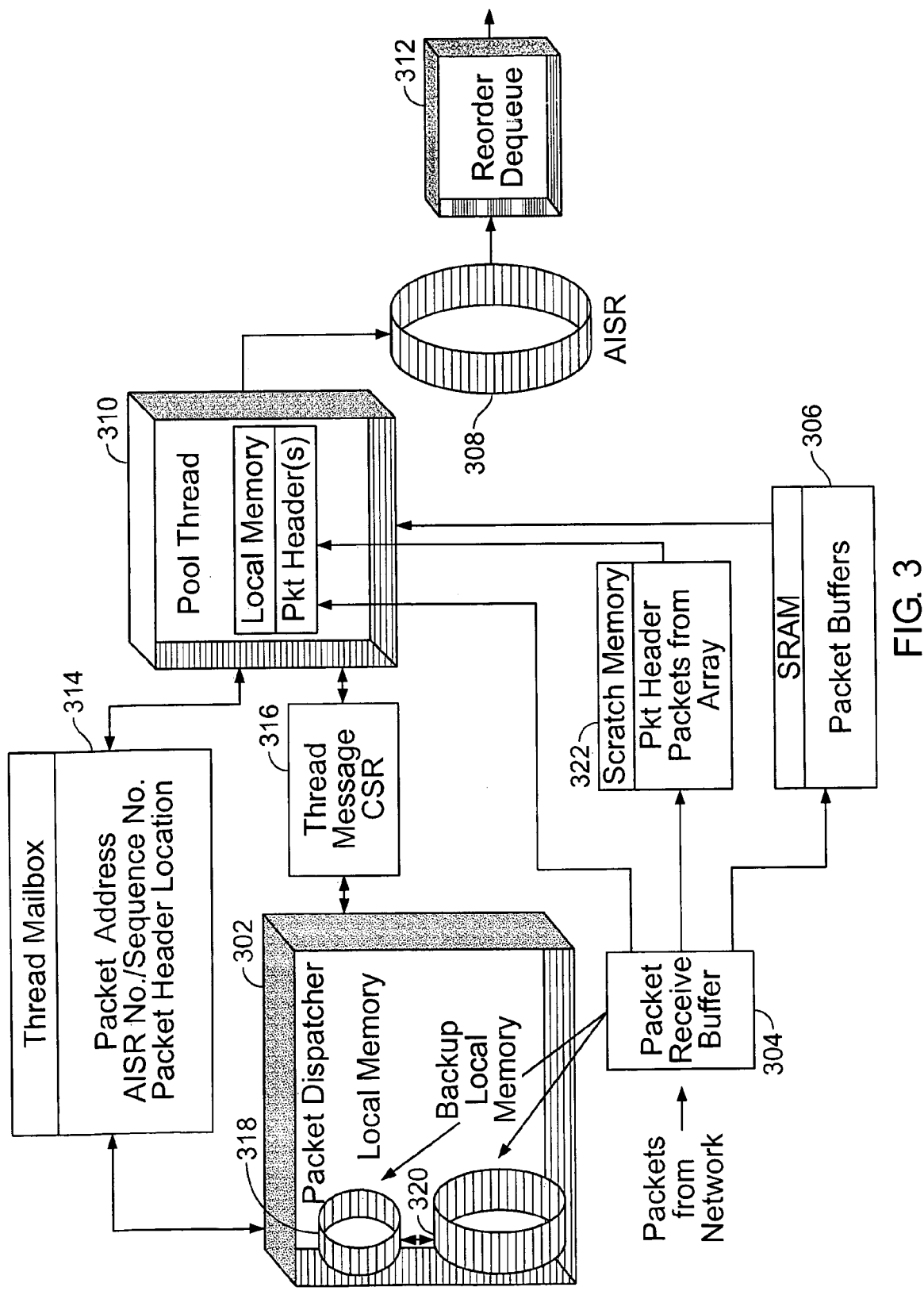
FIG. 3 is a diagram of the processing of a packet.

Referring to FIG. 3, the packet dispatcher 302 resides on a processor inside the network processor and requests packets from the network interface. The packet dispatcher 302 is notified when a packet segment (e.g., 128 bytes) has been received by a packet receiver buffer 304. The packet dispatcher 302 moves the packet segment payload into DRAM 306. The packet dispatcher 302 stores packet reassembly state information to reassemble the packet. As successive segments are received for a packet, the dispatcher 302 uses the state information to direct and assemble the segments in space allocated in DRAM 306 by the packet dispatcher 302.

Each packet received is assigned a sequence number, in ascending order. The sequence number allows the packets to be dequeued in the order they were received. The sequence number range corresponds to a slot in a ring in memory called an Asynchronous Insert Synchronous Remove (AISR) 308 ring. When a thread 310 in the pool of threads has taken its assigned packet and finished processing the packet, the thread 310 sends the processed packet to DRAM 306. The thread also signals completion of the processed packet to the indexed location in the AISR 308, based on the packet's sequence number. This ensures that the results are stored in ascending addresses by order of packet arrival. The reorder dequeue 312 reads the AISR 308 in ascending order, checking to see if packet information has been assigned to the slot. The reorder dequeue 312 will continue checking the slot in the AISR 308 until packet information is found in the slot. The system provides a First In First Out (FIFO) routine while efficiently processing packets out of order.

When a packet is received, the dispatcher 302 assigns the packet to a thread 310 in the pool of threads. Each thread in the pool makes itself available by signaling the dispatcher via either a thread mailbox 314 or a message CSR 316. Each thread 310 has a memory that allows the thread to work on a presently assigned packet and store the next assigned packet in memory. The thread 310 communicates its memory and processing availability and location of the thread to the packet dispatcher 302. The dispatcher 302 communicates select packet state information back to the assigned threads. The packet state information can include, for example, the packet payload's address in DRAM 306 and the sequence number.

There are multiple methods by which the thread 310 can communicate its availability and the packet dispatcher 302 can assign a packet to that thread 310. A thread 310 can communicate its availability through a Control and Status Register (CSR) 316. Each thread can write to a few bits of the CSR 316. The packet dispatcher 302 can read and clear the CSR 316, thus providing the status of many threads at one time. Alternatively, the dispatcher 302 and threads 310 can communicate via "mailboxes" 314. The thread 310 can signal its availability by flagging or placing an identifier in the mailbox 314. The dispatcher polls each thread mailbox until it identifies an available thread. The dispatcher 302 can write the packet state information to the mailbox 314 for the available thread.

The threads 310 in the pool can finish their assignment at any time. Some will take a long time, probing deep into the packet header. Others will finish early. Once the thread 310 is finished processing the packet, the thread sends the packet information to the AISR ring 308 in the location of the sequence number given to the packet during initial processing. The thread 310 is now available to process the next packet and signals its availability to the packet dispatcher 302. The reorder dequeue 312 cycles through the AISR ring 308 and dequeues the packets to the network based on the order the packets were received.

A backlog (or bottleneck) can result when the microengine receives an above-average amount of packets that require in-depth processing. If the dispatcher 302 receives a new data packet from the network at a time when all the threads 310 are processing assigned data packets, then the dispatcher 302 is forced to drop the new packet, leave the packet in the packet receiver buffer 304 or find temporary storage for it. The dispatcher 302 has a memory 318. Similar to the AISR ring 308 discussed earlier, the dispatcher memory 318 is a ring that allows the dispatcher 302 to assign packet state information to a slot in the memory ring. The dispatcher 302 continues assigning newly enqueued packet state information sequentially in the slot of the memory ring 318. When threads 310 in the pool of threads become available the dispatcher 302 assigns packet information starting with the oldest saved slot and sequentially assigns packets to newly available threads memory 310.

If the backlog continues to the extent that all the slots of the dispatcher memory ring 318 are filled, in one embodiment the dispatcher starts to assign slots to a backup memory ring 320. This process is similar to the process of assigning and retrieving slot information from the memory ring 318. The difference is that the backup ring can use memory that would normally be allocated to other resources when there is no need for the backup ring. In another embodiment, the primary dispatcher memory ring 318 is made larger in order to handle the largest bottleneck of packet processing.

In one embodiment, the dispatcher 302 can use the microengine scratch memory 322 to store packet information. If a packet-processing bottleneck causes all the slots in the dispatcher memory 318 to become filled, the dispatcher 302 can assign packet information to the microengine scratch memory 322. Once the bottleneck is relieved the dispatcher 302 assigns the packet information in the scratch memory 322 to the available thread memory 310. The dispatcher 302 can also assign packet information to the DRAM 306 if the dispatcher memory 318 and the scratch memory 322 are filled due to the bottleneck. The dispatcher 302 can also assign packet information to the DRAM 306 if the dispatcher memory 318 is filled and the scratch memory 322 is filled with other data assigned to scratch memory by the microengine processor. The process provides for efficient storage of packet information during bottlenecks while restraining the use of DRAM 306 bandwidth and other memory resources of the microengine.

Figure 4:
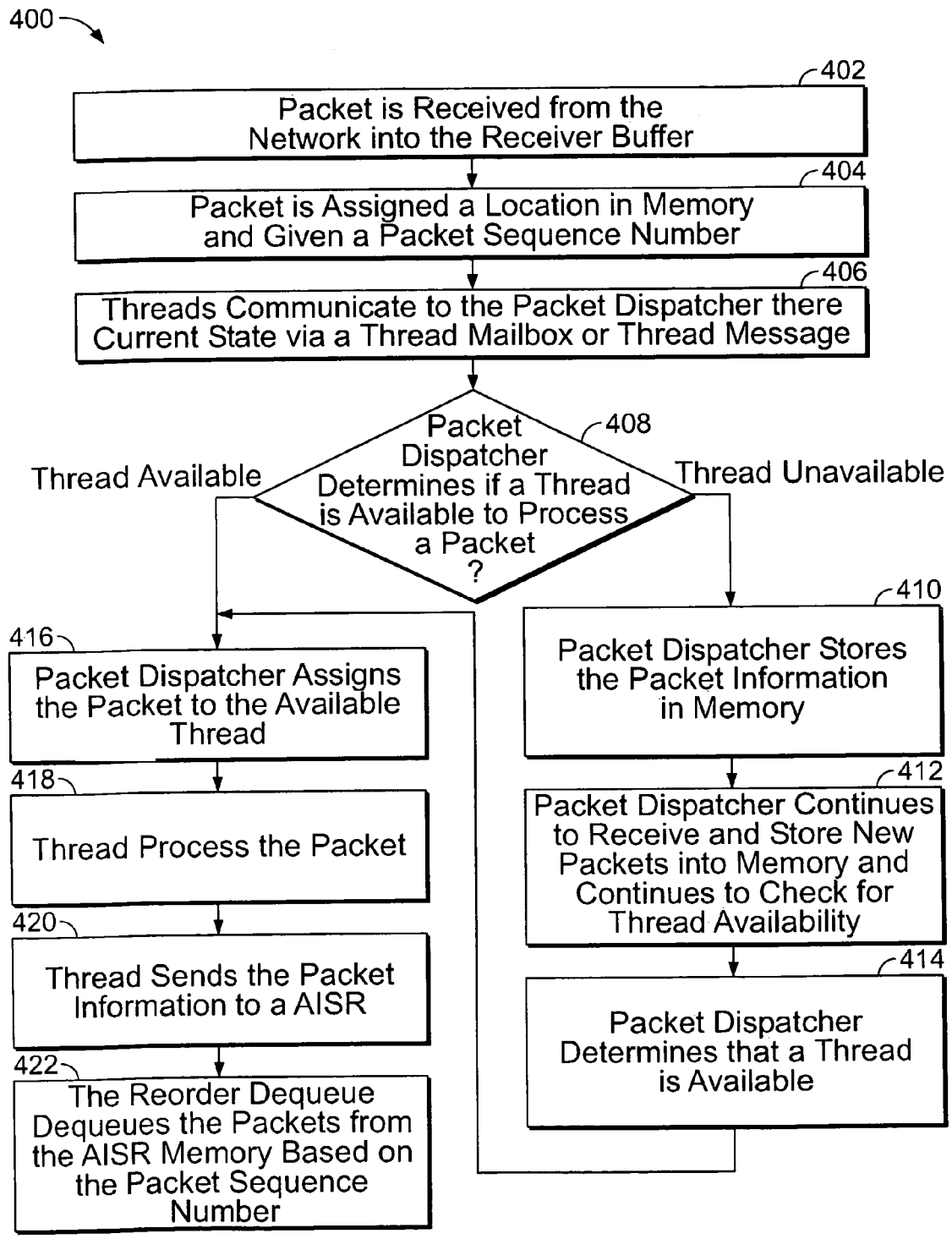
FIG. 4 is a flow chart of the processing of a packet.

Referring to FIG. 4, the flowchart shows the processing of data packets 400 by the microengine. The data packet is received from the network into the receiver buffer 402. The dispatcher gives the data packet a packet sequence number and assigns a location in memory for the thread information 404. The sequence number allows the packets to be processed by the threads in an order independent of the order the threads will be dequeued back to the network or general processor. The threads independently communicate to the packet dispatcher regarding their available state 406. A thread 408 in the pool can make itself available even when it is busy processing a packet. The thread 408 stores the packet it is processing and stores the next packet intended for processing by the thread. This allows each thread 408 to handle two packets at a time. Once the dispatcher determines an available location in a thread 408, the packet dispatcher assigns the packet information to the memory of the available thread 416. If the dispatcher determines that there are no available threads at that time 408, the packet dispatcher stores the packet information temporarily in memory 410. The packet dispatcher continues to receive packets, process the packets (e.g. assign a sequence number, a storage location, and determine reassembly information), and store the packet information in the next sequential memory slot 412.

Once the dispatcher determines a thread is available 414, the dispatcher sends the packet information into the available thread's local memory 416. The thread processes the packet and then sends the packet information to the AISR ring in memory based on the sequence number in the packet information 420. The reorder dequeue sequentially pulls the packet information from the ring and sends the packet to the packets future destination 422. In the case of router the packet would be sent onto the network to the next router on the packet path to the packets final destination.

Figure 5:
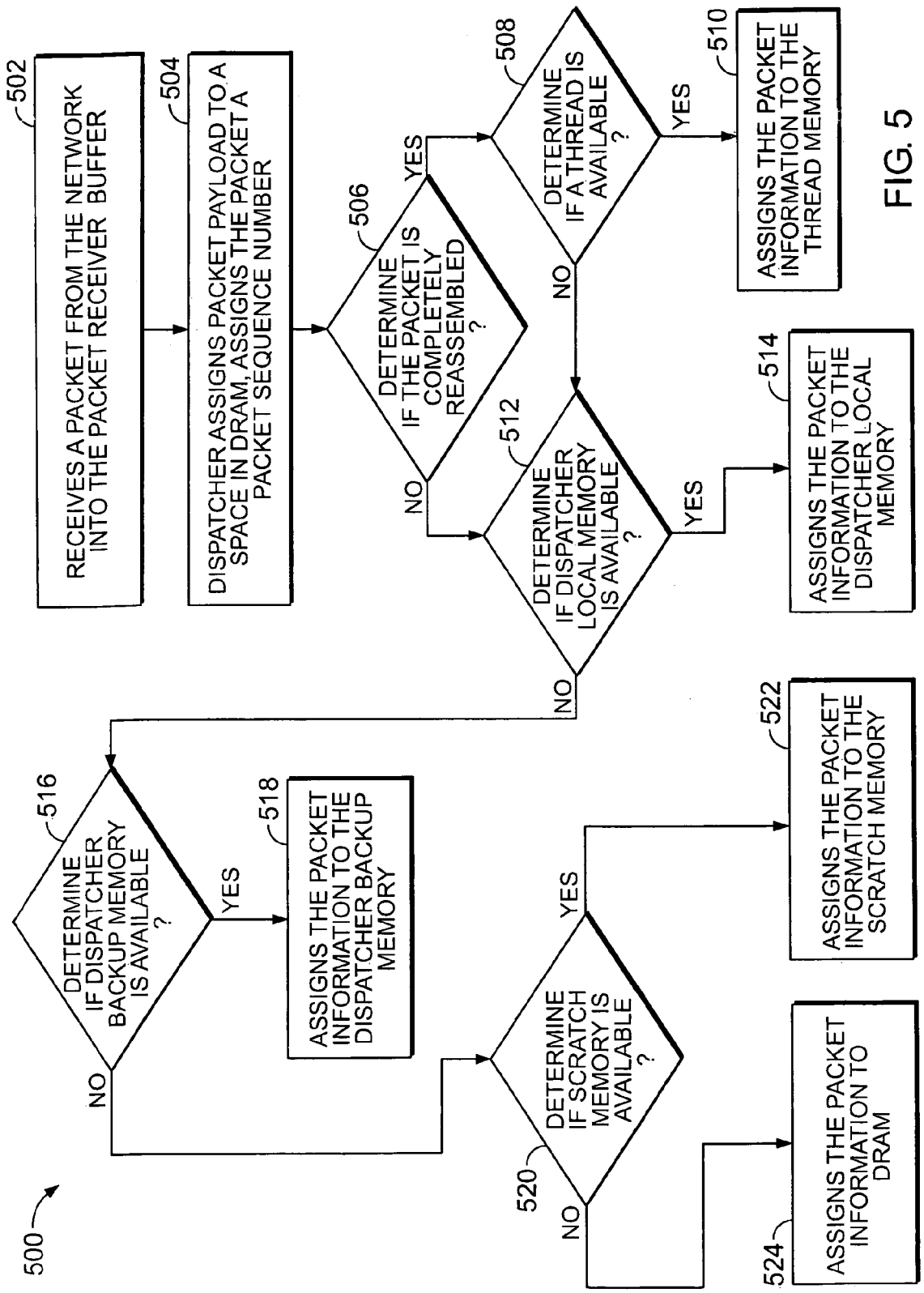
FIG. 5 is a flow chart of the initial handling and storing of packet information prior to processing by the threads.

Referring to FIG. 5, the dispatcher determines the most efficient location to store the packet information 500. By storing the packet information in a variety of the location the dispatcher can efficiently use the microengine's memory and handle overflow produced by bottleneck of thread processing. The packet is initially received into the receiver buffer 502. The dispatcher assigns the packet payload a location in memory and a sequence number 504. The dispatcher determines if the packet has been completely received and is ready for processing 506. If the packet is complete, the dispatcher determines if there is an available thread to process the packet 508. If a thread is available the dispatcher can send the packet information directly to the available threads memory 510. However, if there are no available threads or the packet has not been completely reassembled the dispatcher determines the best location to store the packet information until both of these conditions are satisfied. The dispatcher checks the dispatcher's memory ring 512. If the memory ring is available the packet assigns the packet to a slot in the memory ring 514. If memory ring is filled and unavailable, the dispatcher checks the memory slot availability of the dispatcher's backup memory. If the backup memory has space available the packet information is assigned to a slot in the backup memory ring structure 516. When both backup and primary memory of the dispatcher are filled the dispatcher will check the scratch memory of the microengine 520. If the memory is available the dispatcher will assign the packet information to the scratch memory 522. Otherwise the dispatcher can assign the packet information to DRAM 524. The process allows the dispatcher to assign memory to a variety of memory location rather than continually sending the overflow of packet information directly to DRAM. The system provides efficient use of bandwidth of the DRAM and the scratch memory. The system also provides memory use for other processing resources when bottlenecks are not present and quickly stores packet information.

A number of embodiments of the packet processing have been described. Nevertheless, it will be understood that various modifications may be made without departing from the scope of the packet processing. Accordingly, other embodiments are within the scope of the following claims.

What is claimed is:

1. A method of processing a data packet at a device, the method comprising:
    receiving a data packet;
    detecting available memory in one or more of local memories of a plurality of execution threads;
    when the detecting available memory in the one or more of local memories of the plurality of execution threads indicates that at least one of the plurality of execution threads is available to process the received data packet, storing packet information in an available one of the local memories of the execution threads;
    detecting available memory in a dispatcher memory that is separate from the local memories of the execution threads; and
    storing the packet information in the detected available dispatcher memory when the detecting available memory in the one or more of local memories of the plurality of execution threads indicates that the execution threads are unavailable to process the received data packet.

2. The method of claim 1 further comprises:
    detecting available memory in shared memory; and
    storing the packet information in the detected available shared memory when the detectable available memory in the dispatcher memory indicates that there is no available memory in the dispatcher memory.

3. The method of claim 2 further comprising:
    storing the packet information in random access memory when the detecting available memory in the shared memory indicates that there is no available memory in the shared memory.

4. The method of claim 2 further comprising:
    storing the packet information in the detected available shared memory when detected that reassembly of the receiving data packet is not complete and the execution threads are not available to process the received data packet.

5. The method of claim 2 wherein storing further comprising:
    storing the packet information in random access memory when detected that reassembly of the received data packet is not complete and the execution threads are not available to process the received data packet.

6. The method of claim 1 further comprising:
    storing the packet information in the detected available dispatcher memory when detected that reassembly of the received data packet is not complete and the execution threads are not available to process the received data packet.

7. The method of claim 1 further comprises:
    detecting available memory in the dispatcher backup memory; and
    storing the packet information in the detected available dispatcher backup memory when the detecting available memory in the dispatcher memory indicates that the dispatcher memory is not available.

8. The method of claim 1 wherein the data packet is received into a receiver buffer.

9. A computer program product, disposed on a computer readable medium, for processing a data packet at a device, the program comprising instructions for causing a processor to:
    receive a data packet;
    detect available memory in one or more of local memories of a plurality of execution threads;
    when the detect available memory in one or more of local memories of a plurality of execution threads indicates that at least one of the plurality of execution threads is available to process the received data packet, store packet information in a available one of the local memories of the execution threads;
    detect available memory in a dispatcher memory that is separate from the local memories of the execution threads; and
    store the packet information in the detected available dispatcher memory when the detect available memory in the one or more of local memories of the plurality of execution threads indicates the execution threads are unavailable to process the received data packet.

10. The program of claim 9 further comprising instructions for causing a processor to:
    detect available memory in shared memory; and
    store the packet information in the detected available shared memory when the detecting available memory in the dispatcher memory indicates that there is no available memory in the dispatcher memory.

11. The program of claim 10 further comprising instructions for causing a processor to
    store the packet information in random access memory when the detecting available memory in the shared memory indicates there is no available memory in shared memory.

12. The program of claim 10 wherein instructions for causing a processor to store further comprise instructions for causing a processor to:
    store the packet information in the detected available shared memory when detected that reassembly of the received data packet is not complete and the execution threads are not available to process the received data packet.

13. The program of claim 9 further comprising instructions for causing a processor to:
    store the packet information in the detected available dispatcher memory when detected that reassembly of the received data packet is not complete and the execution threads are not available to process the received data packet.

14. A system for processing a data packet, the system comprising:
    at least one communication port;
    at least one Ethernet MAC (Medium Access Control) device coupled to at least one of the at lest one communication ports; and
    at least one processor comprising:
        one or more local memories of a plurality of execution threads, and
        a dispatcher memory that is separate from the one or more local memories of the execution threads,
        wherein the least one processor is configured to
            access the at least one Ethernet MAC device,
            receive a data packet,
            detect available memory in the one or more of local memories of a plurality of execution threads,
            store packet information in an available one of the local memory of the execution threads when the detect available memory in one or more of the local memories of the plurality of execution threads indicated that at least one of the plurality execution threads is available to process the received data packet,
            detect available memory in the dispatcher memory that is separate from the local memories of the execution threads, and
            store the packet information in the detected available dispatcher memory when the detect available memory in the one or more of local memories of the plurality of execution threads indicates that the execution threads are unavailable to process the received data packet.

15. The system of claim 14 wherein the at least one processor is configured to:
    store the packet information in the detected available dispatcher memory when detected that reassembly of the received data packet is not complete and the execution threads are not available to process the received data packet.

16. A system of claim 14 wherein the at least one processor comprises a shared memory, and the at least one processor is configured to:
    determine available memory in the shared memory, and
    store the packet information in the detected available shared memory when the detecting available memory in the dispatcher memory indicates that there is no available memory in the dispatcher memory.

17. The system of claim 16 wherein the at least one processor is configured to:
    store the packet information in random access memory when the detecting available memory in the memory indicates that there is no available memory in the shared memory.

18. The system of claim 16 wherein the at least one processor is configured to:
    store the packet information in the detected available shared memory when detected that reassembly of the received data packet is not complete and the execution threads are not available to process the received data packet.

19. A device for processing a data packet comprising:
    a packet receiver buffer to receive a data packet;
    one or more local memories of a plurality of execution threads coupled to the packet receiver packet;
    a packet dispatcher coupled to the packet receiver buffer to detect available memory in the one or more of local memories of a plurality of execution threads, and when the detect available memory in the one or more of local memories of the plurality of execution threads indicates that at least one of the plurality of execution threads are available to process the received data packet, store packet information in an available one of the local memories of the execution threads; and
    a dispatcher memory coupled to the packet dispatcher, wherein the packet dispatcher is configured to detect available memory in the dispatcher memory and when the detect available memory in the one or more of local memories of the plurality of execution threads indicates the execution threads are unavailable to process the received data packet, store the packet information in the detected available dispatcher memory.

20. The device of claim 19 further comprises:
    a shared memory coupled to the packet dispatcher; and
    wherein the dispatcher further detects available memory in the shared memory, and stores the packet information in the detected available shared memory when the detected available memory in the dispatcher memory indicates that there is no available memory in the dispatcher memory.

21. The device of claim 20 further comprising:
    random access memory; and
    wherein the dispatcher further stores the packet information in the random access memory when the detecting available memory in the shared memory indicates that there is no available memory in the shared memory.

22. The device of claim 21 wherein:
    the dispatcher further stores the packet information in random access memory when detected that reassembly of the received data packet is not complete and the execution threads are not available to process the received date packet.

23. The device of claim 20 wherein:
    the dispatcher further stores the packet information in the detected available shared memory when detected that reassembly of the received data packet is not complete and the execution threads are not available to process the received data packet.

24. The device of claim 19 wherein:
    the dispatcher further stores the packet information in the detected available dispatcher memory when detected that reassembly of the received data packet is not complete and the execution threads are not available to process the received data packet.

25. The device of claim 19 wherein:
    the dispatcher further detects available memory in a dispatcher backup memory, and stores the packet information in the dispatcher backup memory when the detecting available memory in the dispatcher memory indicates that the dispatcher memory is unavailable.

26. The device of claim 19 wherein the device is a component of a network processor.

* * * * *